United States Patent [19]

Petrachkoff

[11] Patent Number: 4,944,383

[45] Date of Patent: Jul. 31, 1990

[54] FURNACE CHARGER APPARATUS

[75] Inventor: Peter Petrachkoff, Salem, Ohio

[73] Assignee: PRMG, Inc., d./b./a. Fordees Manufacturing Company, Leetonia, Ohio

[21] Appl. No.: 292,946

[22] Filed: Jan. 3, 1989

[51] Int. Cl.[5] .............................................. B65G 25/00

[52] U.S. Cl. ................................ 198/468.6; 414/156; 414/198

[58] Field of Search ............................ 198/774, 468.6; 414/152, 156, 198

[56] References Cited

U.S. PATENT DOCUMENTS

| | | | |
|---|---|---|---|
| 3,243,059 | 3/1966 | Kalberkamp | 198/468.6 X |
| 3,375,941 | 4/1968 | Repper, Jr. | 198/468.6 X |
| 3,456,774 | 7/1969 | Blickenderfer et al. | 198/468.6 X |
| 3,567,003 | 3/1971 | Towne et al. | 198/468.6 |
| 4,029,215 | 6/1977 | Birdwell | 198/468.6 X |
| 4,147,258 | 4/1979 | Kaplan | 198/468.6 X |
| 4,270,655 | 6/1981 | Noe | 198/774 |
| 4,522,297 | 6/1985 | Jaegers | 198/774 |
| 4,658,954 | 4/1987 | Harlow | 198/774 |

*Primary Examiner*—Robert J. Spar
*Assistant Examiner*—D. Glenn Dayoan
*Attorney, Agent, or Firm*—Clifford A. Poff

[57] ABSTRACT

For use with a reheating furnace for reheating blooms for rolling, in which for charging the furnace with blooms a series of longitudinal moveable arms are provided, for each arm a arm supporting and lifting mechanism comprising two pair of freely rotatable hold down—counterbalancing guide rollers for engaging a tract provided on the arm, a freely rotatable support roller for supporting the arm during their movements, and a piston cylinder assembly for the arm connected to frames of the support roller for raising and lower the roller and hence the arm.

6 Claims, 3 Drawing Sheets

FURNACE CHARGER APPARATUS

BACKGROUND OF THE INVENTION

In the hot rolling process for manufacturing hot rolled products, such as blooms and beam blanks, the workpieces are usually reheated after being rolled in a previous rolling step or as produced by a casting machine to bring the workpieces up to an uniform proper rolling temperature for a subsequent rolling process where the workpieces are further reduced.

The reheating is usually accomplished by a reheating furnace, in which the workpieces are brought to the entry side of the furnace, charged into and passed through the furnace after which the workpieces are discharged at the delivery side of the furnace and transferred away. An example of such furnaces can be found illustrated and described in the publication "The Making, Shaping, Treating of Steel", 10th Edition, 1985, Section 3 entitled "Reheating Furnaces", starting at page 850.

In certain applications, it is important that the workpieces be not pushed into or through the furnace but be carried so as not to damage the surfaces of the workpieces. For this reason some furnaces have been designed with walking beams consisting of a conveyor that carries the workpieces in a step by step fashion, the above publication illustrates and describes such conveyors in a sub-section entitled "Walking Beam Type Furnace" on page 851.

When employing a walking beam type furnace in the above context there must be provided a mechanism for carrying one at a time the workpieces from a position in front of the furnace to a position inside the furnace and placing the workpiece gently on the walking beam conveyor. A similar device, known as an extractor, are provided at the discharge end of the furnace for removing the workpiece and placing it on a table. In the past the workpiece carrying mechanism has been characterized by being expensive to manufacture, unpredictable in operation, not capable of continually accomplishing the required carrying action and costly to maintain.

In addition past chargers and extractors included a hold down or counter balance mechanism for the rams or arms that traversed into and out of the furnace during the workpiece handling operation. This counter balance was accomplished by separate stands for each arm having spring loaded rollers to hold down the arms in their extreme back positions, i.e. when retracted away from the furnace. Incorporated in the roller arrangement for each arm was an arm elevating device designed to hold down the arm and act as a counter balance for the arm.

SUMMARY OF THE INVENTION

The present invention provides an improved workpiece handling apparatus of the type above described capable of an accurate elevational carrying motion, characterized by dependability, both in operation and maintenance, and being less expensive to manufacture than previous units.

More particularly, the invention provides a workpiece handling device, including an unitary simple mechanism for supporting the charger arms in a manner in which the arms are held down, counterbalanced and guided in a control manner during the raising, lowering and traversing of the arms which carries the workpiece into the furnace without requiring the employment of a separate stand and roller assembly for holding down and counterbalancing the arms.

In one form, the present invention comprises a support and lifting mechanism for an arm, including arm supporting means having a relatively friction free arm supporting surface, means having an arm restraining means arranged to prevent the arm from moving away for the supporting surface, and power means connected to the supporting means for selectively raising and lowering the supporting means and hence the arm.

DESCRIPTION OF THE INVENTION

Figure 1:
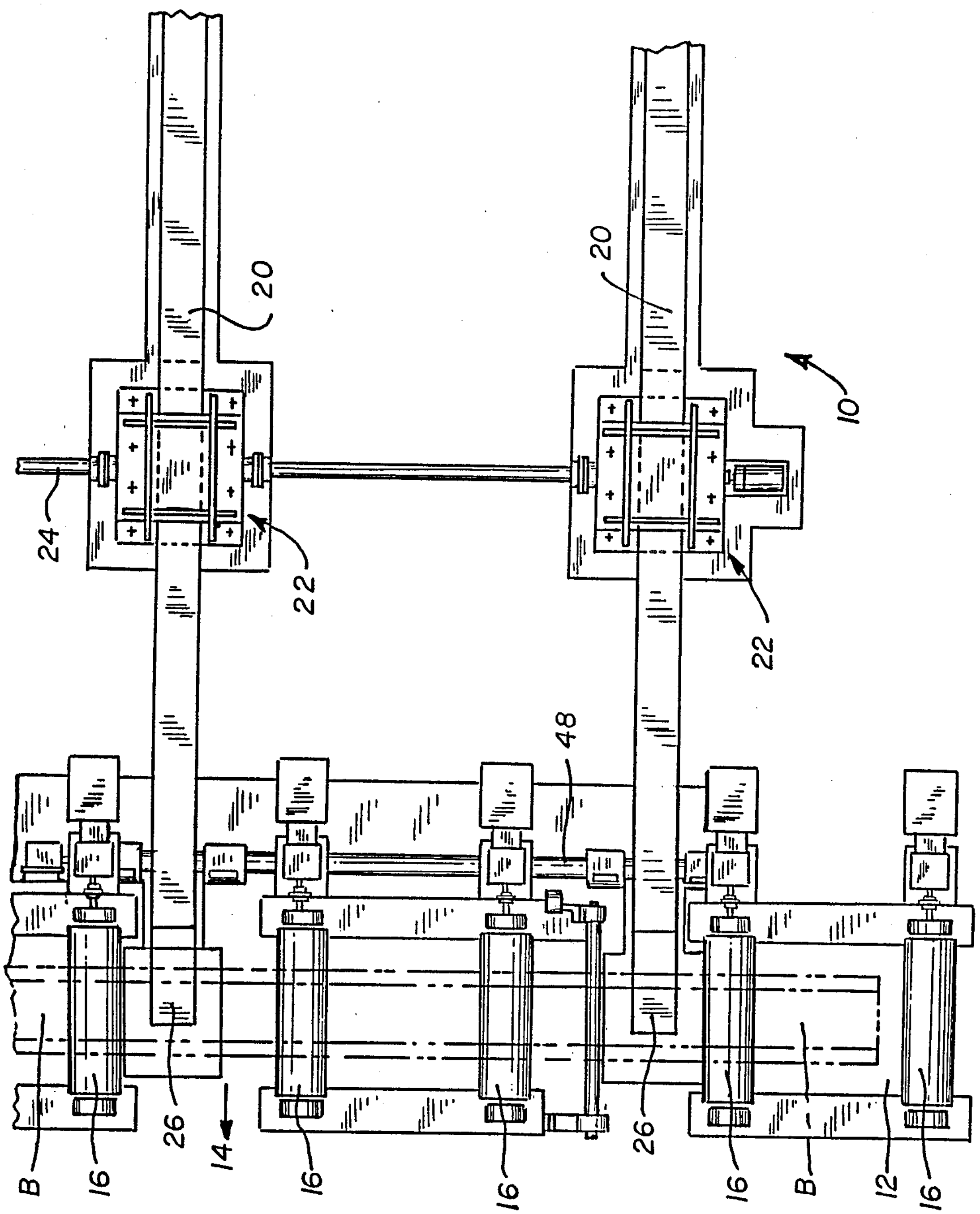
FIG. 1 is plan view of a furnace charging mechanism for a walking beam furnace, not shown, incorporating the features of the present invention.

With reference first to FIG. 1, there is illustrated a portion of a bloom handling mechanism 10 for a walking beam furnace, not shown. Since these two units are well known in the rolling mill industry the description of the invention will be described only in detail terms as to the charger arms with which the invention cooperates and for which it is specifically designed to control the elevational movement thereof into and out of the furnace.

In the way of a background reference for the control mechanism for the charger arms, FIG. 1 includes a furnace entry table 12, arranged in front of the entry side of the furnace indicated by the reference character 14 and its associated arrow, the arrow pointing in the direction of the furnace. The table, in the usual manner, consists of a number of spaced apart rollers 16, driven by individual motors only one being shown at 18, the table having a length sufficient to accommodate the longest bloom received by the furnace, the bloom being indicated in outline form by the reference character B, and takes the cross sectional form illustrated in FIG. 2.

Figure 2:
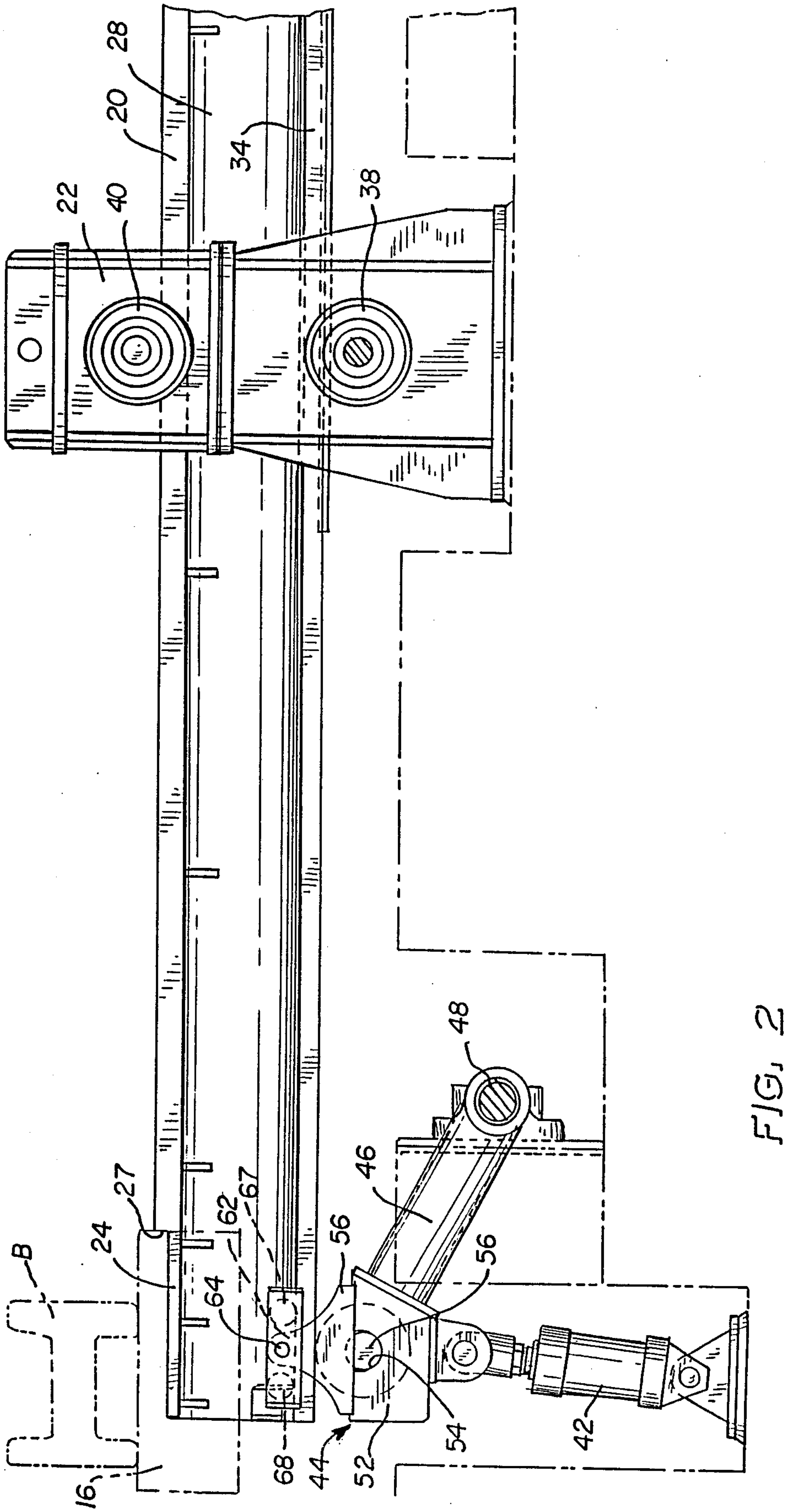
FIG. 2 is an elevational view of a portion of the mechanism shown in FIG. 1.

FIG. 2 also shows that the bloom handling mechanism is made up in unitary fashion of a number of transversely extending parallel arranged charger arms 20, having a length sufficient to remove a stationary bloom from the table 12 and transfer it to a discharge point within the furnace, the arms being arranged between two adjacent table rollers 16, as shown in FIG. 1. Also shown are separate driving units 22 for each charger arm 20, the units being arranged at approximately the quarter point of the arms most adjacent the table 12. The units 22 are driven from a common motor, not shown, but which is connected to a drive shaft 24.

In still referring to FIG. 2, the left hand end of each charger arm 20 is shown having a bloom lifting portion 24 which in the inoperative position of the arm falls below the top supporting surface of the table rollers 16, one of which is shown in outline form supporting a bloom B. The portion 24 has a flat bloom carrying surface, shown in FIG. 1 at 26. According to usual practice and while only two charger arms are shown, the mechanism may consist of three or more arms which work as a unit, in which their combined carrying surfaces 26 are designed along with the spaced relationship of the arms to assure the proper support of the bloom when being lifted off the table until it is placed on the conveyor of the furnace. Where the surface 26 terminates at its inside portion there is provided an upward projection 27 for preventing the bloom from sliding off the surface 26 on its transfer to the furnace.

Each charger arm in cross section takes the form of a rigid upright I beam 28 having similar upper and lower transverse extending portions, the lower portion 30 having opposed track portions 32 on its upper surface and a rack 34 secured to its lower surface which as noted in FIG. 2 runs along its entire length. In referring to both FIGS. 1 and 2, with reference to the beam 28, and with reference to the drive units 22 for moving longitudinally the arms 20 through the operational cycle, each arm is provided with a driven pinion 38 arranged to mesh with the rack 34, the proper meshing relation being assured by a hold down guide roller 40 arranged to engage the top surface of the beam 28, the driving relation being maintained even in the tilted position of the arm when the bloom B is lifted off the table rollers 16.

As shown in FIG. 2, attention will not be given to the improved arrangement for effecting and controlling the movement of the charger arms 20 during their working cycle. Each arm 20 beneath its lower surface is provided with an hydraulic piston cylinder assembly (cylinder) 42 having its piston connected to a lifting frame 44, which is indirectly connected to the beam portion 30 of the arm and directly connected to an angularly disposed guide strut 46 pivotally supported by a synchronizing shaft 48. As shown in FIG. 1, the shaft 48 extends between the arms 20 and mechanically ties together the separate cylinders 42 of each arm to assure movement in unison of the arms on the simultaneous but separate operation of the cylinders 42.

Figure 3:
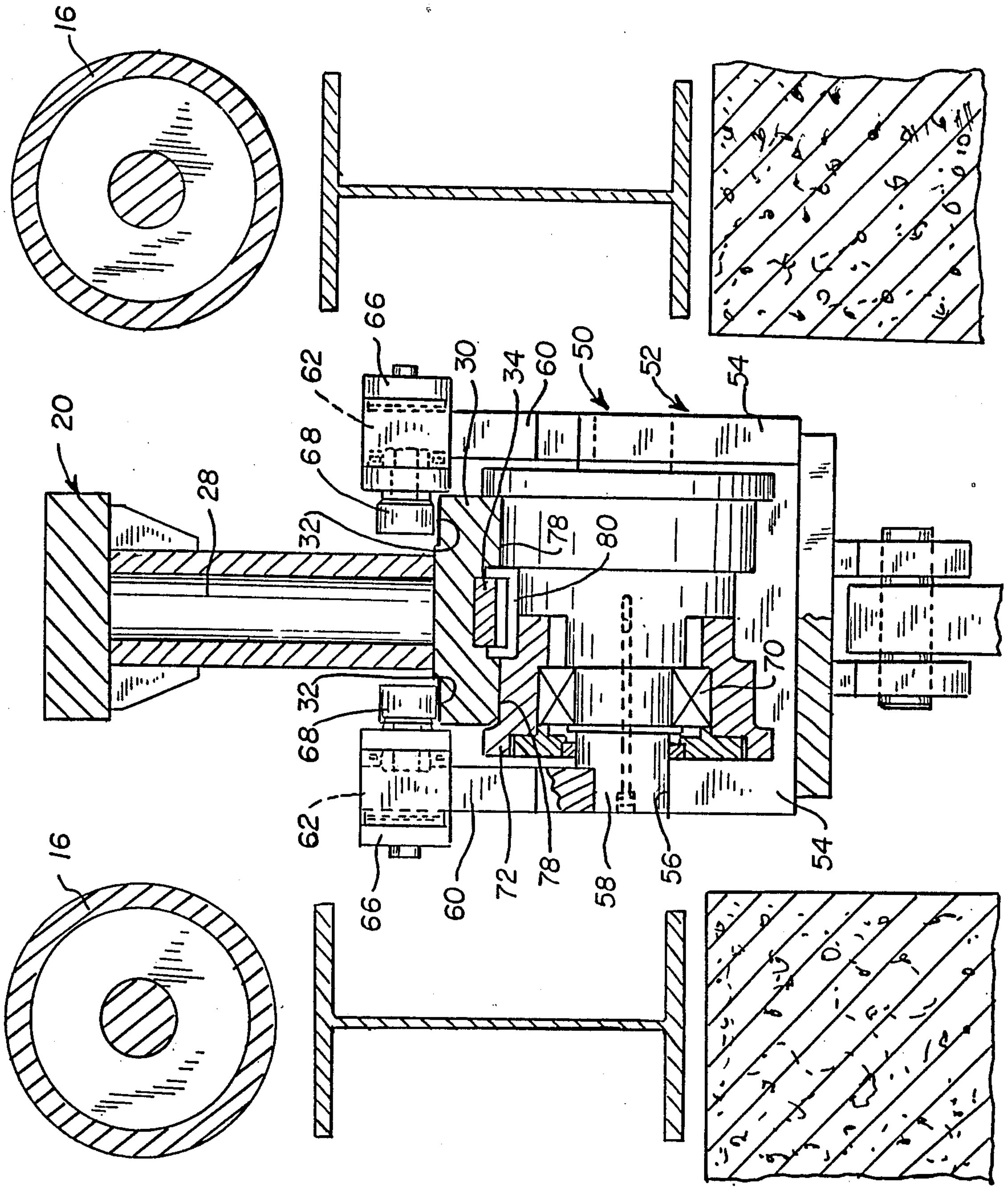
FIG. 3 is an enlarged partial section view of the charger arm lifting mechanism shown in FIG. 2.

The charger arm lifting mechanism is shown more in detail in FIG. 3, where particular attention is directed to the lifting frame 44. The frame is made up of an upper portion 50, a lower portion 52 and the strut 46, the lower portion 52 having two spaced parallel sections 54 arranged on opposite sides of the beam 28 and extending upwardly in the direction of the beam. The upper surface of the frame portion 52 is machined and in addition is formed with one half of a hole 56 for receiving the lower portion of a shaft 58, the other half of the hole being formed in the upper portion 50 which also consist of two matching sections 60, the cooperative portions 50–52 being bolted together to form a rigid structure for supporting the shaft 58 at its opposite ends.

At the upper most area of the upper section 60, each section is formed with an eyelet portion 62 for receiving a pin 64 to which is pivotally secured for rotation there about a generally horizontally extending bar assembly 66. The bar assembly consist of two spaced apart bars arranged on the opposite sides of the associated eyelet portion 62. This construction allows the two bar members to rotatably support a pair of horizontally projecting rollers 68 located to ride on the track 32 of the charger arm 20, the pivotal support construction of the bar assemblies allowing the rollers 68 to maintain contact with the arm during the entire travel of the arm. FIG. 3 indicates that a gap is provided between the rollers 68 and the tract 32 that assures the pivotal action of the bar assembly 66.

Returning now to the shaft 58 shown in FIG. 3, the shaft carries spaced bearing 70 of well known construction, only one bearing being shown, on which is mounted a freely rotatable collar or roller 72 being characterized by two spaced arm supporting surfaces 78 between which is formed a cavity 80 to allow the passage of the rack 34. Thus, it will be appreciated that the lower portion 30 of the beam 28 is in direct supporting contact with the surfaces 78 of the roller 72 and constrained in this position by the rollers 68. In this construction, on operation of the cylinder 42 the roller 72 raises and lowers the associated arm 20 and on movement of the arm the roller 72 rotates about the bearings 70. The roller 72 and rollers 68 thus furnish a relatively friction free support system allowing employment of the smallest possible prime mover, a most efficient construction for holding down and counterbalancing the arm in a construction that adds nothing to the weight of the moveable charger arm 20 and allows the arm to be easily driven by the drive unit 22 and further that possesses all the advantages enumeration above, including the accurate control of the lifting and depositing action of the carrying portion 24 of the arm.

While the operational characterizations of the bloom handling mechanism has been given in the above description of the separate parts, there is one aspect that should be amplified. As best shown in FIG. 2, with the charger arms 20 in their ambushed positions illustrated, the arms are first advanced to position the bloom carrying surfaces 24 beneath the entire extremities of the bloom, after which the cylinders 42 are operated to lift the arms in unison to in turn lift the bloom clear of the rollers 16. Thereafter and with the cylinders 42 in their raised position the charger arms 20 are advanced into the furnace and when over the conveyor of the furnace the cylinders 42 are again operated to lower the bloom carrying surfaces 24 to gently deposit the bloom on the conveyor. The charger arms then can be retracted to their ambushed positions under the upper surfaces of the table rollers 16.

It will be appreciated that the disclosed embodiment of the invention can be modified without departing from the invention and that the work piece handling mechanism can be employed for other purposes with or without reheating systems and in other operational conditions, such as the discharge side of a reheating furnace, and with other types and forms of workpieces.

I claim:

1. In combination with a workpiece handling apparatus having a horizontal extending arm and a workpiece carrying means at its one end for effecting vertical and horizontal manipulations of the workpiece, said arm having opposed horizontal relatively friction free contacting surfaces comprising a lower contacting support surface for said arm and two upper surfaces serving as restraining surfaces for said arm, a support and lifting means for said arm, including:

first roller means for engaging said lower arm contacting surface in a manner to support said arm while permitting relative movement therebetween, second roller means comprising two cooperative pairs of spaced anti-friction rollers, including means for mounting each cooperative pair of rollers on an opposite side of said arm with respect to said two upper contacting surfaces, in a manner that said two upper contacting surfaces move beneath the cooperative pairs of rollers and contact their adjacent surfaces to restrict vertical relative movement between said arm and said second roller means, means for pivotally mounting said cooperative pairs of rollers in a manner that said pairs move as a unit whereby both rollers of each pair are positionable to accomplish said restricting effect on said arm, power means connected to said arm and said support means for moving said arm and support means for effecting said horizontal and vertical manipulations, respectively.

2. In combination with claim 1, wherein said support and lifting means includes a frame means comprising spaced apart upright members, each member arranged to carry a different pair of said cooperative pairs of rollers, shaft means for supporting said first roller means in a manner to allow said first roller means to rotate relative to said shaft means on movement of said arm, said frame means having means for supporting said shaft means and in turn said first roller means, rack means carried by said arm, said power means including means for meshing with said rack means for moving said arm in said horizontal direction, and a cavity formed in said first roller means sufficient in size to allow the passage of said rack means relative to said first roller means.

3. In combination with claim 2, wherein said power means for effecting said vertical manipulation includes a piston cylinder assembly, and said frame means includes strut means having an inner end pivotally connected to a part of said frame means at a point adjacent to said support means thereof and an outer end pivotally connected outward of said point for controlling the path of movement of said frame means for effecting said vertical manipulation on the operation of said piston cylinder assembly.

4. In combination with a workpiece handling apparatus having at least two horizontal extending arms and a workpiece carrying means at their one ends for effecting vertical and horizontal manipulations of the workpiece, a support and lifting mechanism for each said arm including arm supporting means having a relatively friction free arm supporting surface, arm restraining means for each arm arranged to contact said arms to assist in guiding their movements with respect to a said associated supporting surface, first power means connected to each said supporting means for selectively raising and lowering said supporting means and hence said arms for effecting said vertical manipulation, synchronizing shaft means for interconnecting said separate power means, and means for operatively connecting said shaft means to each said support and lifting mechanism of said arms, whereby said arms are raised and lowered in unison on operation of said first power means, and second power means connected to said arms for selectively moving said arms for effecting said horizontal manipulation.

5. In combination with claim 4, wherein each said connecting means includes strut means having an inner end pivotally connected to a part of a said associated arm restraining means at a point adjacent said arm supporting means and an outer end pivotally connected outward of said point for controlling the path of movement of a said associated arm for said vertical manipulation on the operation of said first power means.

6. In combination with claim 4, wherein each said support and lifting mechanism for said arms, includes:

first roller means for engaging said arm supporting surface in a manner to permit relative movement therebetween, second roller means comprising two cooperative pairs of spaced anti-friction rollers, including means for mounting each cooperative pair of rollers on an opposite side of said arm with respect to said supporting surface, in a manner that said supporting surface moves beneath the cooperative pairs of rollers and contacts their adjacent surfaces, and means for pivotally mounting said cooperative pairs of rollers in a manner that said pairs move as a unit relative to said arm on movement of said arm.

* * * * *